(12) United States Patent
Koppel et al.

(10) Patent No.: US 7,257,766 B1
(45) Date of Patent: Aug. 14, 2007

(54) SITE FINDING

(75) Inventors: Moshe Koppel, Efrat (IL); Eyal Lanxner, Jerusalem (IL)

(73) Assignee: Egocentricity Ltd., Efrat (IL)

( * ) Notice: Subject to any disclaimer, the term of this patent is extended or adjusted under 35 U.S.C. 154(b) by 652 days.

(21) Appl. No.: 09/605,987

(22) Filed: Jun. 29, 2000

(51) Int. Cl.
  *G06F 17/30* (2006.01)

(52) U.S. Cl. .................................. 715/501.1; 715/513
(58) Field of Classification Search .............. 715/501.1, 715/513; 703/3, 5, 104.1
  See application file for complete search history.

(56) References Cited

U.S. PATENT DOCUMENTS

| | | | | |
|---|---|---|---|---|
| 5,884,305 | A | | 3/1999 | Kleinberg et al. |
| 5,890,172 | A | * | 3/1999 | Borman et al. ........... 715/501.1 |
| 5,960,429 | A | * | 9/1999 | Peercy et al. ................... 707/5 |
| 6,189,018 | B1 | * | 2/2001 | Newman et al. ......... 715/501.1 |
| 6,211,874 | B1 | * | 4/2001 | Himmel et al. ............. 345/781 |
| 6,226,655 | B1 | * | 5/2001 | Borman et al. .......... 715/501.1 |
| 6,421,675 | B1 | * | 7/2002 | Ryan et al. ................. 707/100 |
| 6,517,587 | B2 | * | 2/2003 | Satyavolu et al. ....... 715/501.1 |

OTHER PUBLICATIONS

Carriere, J. et al.; "WebQuery: Searching and Visualizing the Web through Connectivity"; http://www.cgl.uwaterloo.ca/Projects/Vanish/webquery-1.html.
"Google Search—Search the Web with Google!"; http://www.enablelink.com/google.htm.
Chakrabarti,S. et al.; "Mining the Web's Link Structure"; IEEE Computer; Aug. 1999; pp. 60–67.
Kleinberg,J.M.; "AuthorativeSources in a Hyperlinked Enviroment"; IBM Reasearch Report RJ10076(91892), topic area "ComputerScience"; May 29, 1997; pp. 1–31.
Bharat,K. et al.; "Improved Algorithmsfor Topic Distillation in a Hyperlinked Environment;" 1998; Research and Development in Information Retrieval; pp. 104–111; Retrieved from Internet: <http://citeseer.nj.nec.com/bharat98improved.html>.
Chakrabarti,S. et al.; "Automatic Resource Compilation by Analyzing Hyperlink Structure and Associated Text;" 1998; Proceeding of the 7th International World Wide Web Conference; Retrieved from Internet: <http://citeseer.nj.nec.com/chakrabarti98automatic.html>.
Kleinberg,J.M.; "AuthoritativeSources in a Hyperlinked Environment;" Sep. 5, 1999; Journal of the ACM; vol.46, No.5; pp. 604–632; Retrieved from Internet: <http://citeseer.nj.nec.com/klienberg97authoritative.html>.
Pirolli,P. et al.; "Silk from a Sow's Ear: Extracting Usable Structures from the Web;" 1996; Proc.(ACM)Conf.Human Factors in ComputingSystems; ACM Press; Retrieved from Internet: <http://citeseer.nj.nec.com/pirolli96silk.html>.

\* cited by examiner

*Primary Examiner*—Stephen S. Hong
*Assistant Examiner*—Gregory J. Vaughn

(57) ABSTRACT

A method of finding WWW pages, each of which includes at least one list of links to desired Internet resources, comprising:

providing a list of ULRs;

automatically generating at least one query for an Internet search tool for WWW pages that include links to at least one URL of said list of URLs;

executing said at least one generated query to provide search results that include at least one of said searched for WWW pages; and generating a response comprising at least one indication of one of said WWW pages, responsive to said search results.

73 Claims, 2 Drawing Sheets

SITE FINDING

FIELD OF THE INVENTION

The present invention relates to searching for information on a data network, and especially to searching utilizing an analysis of the results of search engines.

BACKGROUND OF THE INVENTION

It is known in the art to analyze data networks, such as journals and journal citations, to determine meta knowledge about the field.

IBM Inc., described a method of determining hubs and authorities on the Internet, in U.S. Pat. No. 5,884,305, in a U.S. patent application No. 08/813,749 filed Mar. 7, 1997, mentioned in the patent and in "Authoritative Sources in a Hyperlinked Environment", by Jon M. Kieinberg, in IBM research report RJ10076(91892), topic area "Computer Science", May 29, 1997, the disclosures of which are incorporated herein by reference. Hubs are Internet sites that contain links to many other sites in a same field and authorities are sites that are pointed to by a significant number of relevant sites in a field. An iterative process was suggested to determine, from among a predetermined set of sites, a kernel of sites that match a hub or authority definition. In the Kleinberg paper, it is noted that the Internet is to be considered a different type of data network than journal articles.

A paper entitled "Mining the Web's Link Structure", by S. Chakrabarti et al., in *IEEE Computer*, August 1999, the disclosure of which is incorporated herein by reference, describes analyzing link structures of WWW pages to determine hubs and authorities. At a site "http://www:google.com", available on Feb. 1, 2000 and for some time before, a tool "googlescout" is generated for detecting WWW sites that are similar to a shown site, for example for finding competition.

A WWW page "www.cgl.uwaterloo.ca/Project/Vanish/webquery_1.html", apparently available at least from Dec. 11, 1996, the disclosure of which is incorporated herein by reference, describes the "webquery" project, in which a quality of a site that turns up in a search is evaluated based on the number of sites linked to the site and the number of sites links in the site.

SUMMARY OF THE INVENTION

An object of some embodiments of the invention is finding one or more hub sites or lists of WWW pages that cover a topic presented by a set of input sites. In an embodiment of the invention, the hubs or page lists are selected by virtue of their including links to a significant number of the sites in the set of the input sites. An expected advantage of using hubs is that each may concentrate in it a large number of links to relevant sites, beyond those provided in the input set, and also include additional information which can help a human user select certain sites for browsing.

An aspect of some embodiments of the invention relates to selecting a potential hub based on a statistical analysis of an Internet link structure, for example, using an approximation of a number of links from the potential hub to a set of input sites; rather than determining which sites from the input set are actually pointed to. In one embodiment of the invention, this determination is made by searching for potential hubs that include links to groups of input sites and then ranking the resulting potential hubs, based on the number of groups pointed to by each potential hub. As a potential hub might include links to more than one site in an input group, the approximation may be significantly different from the actual number of links between a potential hubs and individual member sites of input groups. It is noted that in some embodiments, that is no final determination of which particular site is pointed to by the potential hub.

An aspect of some embodiments of the invention relates to a method of automatically determining a hub-potential of a site, for example for ranking hubs in a set of potential hub or for finding potential hubs in a search. In one embodiment of the invention, a hub potential of a site is determined based on structural properties of the site, for example, the existence of a list of links and/or the existence of a text paragraph (e.g., a review or description) of many of the links. Optionally, the number of links is determined by counting the occurrence of the phrases which indicate the presence of links, such as "http:" or "href". Alternatively or additionally, a hub-potential may be determined based on the usage of key terms of the topic the site in general and/or in anchor portions of the site in particular, such as a main title or a section heading. Alternatively or additionally, a hub-potential may be determined based on a usage of hub-typical words or phases, such as "list of links", "links", "index", "list", "compilation" and/or "resources". Optionally, these words or phrases receive a higher scoring based on their location in the site, for example in a title or before a long list of links.

In one embodiment of the invention, the potential hubs are ranked and/or filtered before being analyzed in greater depth. Alternatively or additionally, the hub generation process may create a small set of potential hubs to begin with, for example using a threshold setting. Such ranking may include, for example, selecting only a subset of those sites that point to the input set of sites, for example based on the existence of a topic word in those sites, prior to analyzing the sites for hub-potential. In another example, potential hubs that are found using a search engine are required to both include a topic word and at least one link to one group of sites from the input site.

In an embodiment of the invention, hub potential is characterized by rules, which may be phrased in a search engine command language, so a search for the hubs using the search engine returns sites with a higher potential of being desired hubs. In an embodiment of the invention, the particular features of a search engine, for example, searching for URLs or links, disjunctive search and/or pipes, are used to perform one or more of the above activities, for example, group comparison, rule application and/or thresholding of potential hubs, more efficiently.

In one embodiment of the invention, an input set of sites is generated by a user providing a topic or topic words and generating, for example by one or more search engine(s) and/or internet indexes, a list of sites relevant to that topic. Optionally, the list of sites is filtered prior to being used as a basis for finding hubs, for example by removing redundant and/or mirroring sites.

Alternatively or additionally, an input set of sites is generated from a user provided site. The user provided site can be analyzed to find a second set of sites that is similar to the provided site. One exemplary method of determining similarity is by finding hubs as defined above which point to the site and selecting links from those hubs as similar sites. Another exemplary method is to receive a short list of example for such similar sites. Another exemplary method is finding sites that contain similar to test to the provided site. Optionally, the user provides a set of sites, rather than a single site.

Optionally, hubs that point to the similar sites and not to the provided sites are determined. In some embodiments, these hubs are treated as hubs to which a link to the provided site should be added, for example by suggested to the hub operators.

Alternatively or additionally, an input set of sites is generated by analyzing n provided hub or a hub obtained from previous use of hub-finder or a hub constructed by combining search results/analysis of existing hubs or other user provided information.

Alternatively or additionally to providing a hub as an input, a list of a user's favorite bookmarks or recently or frequently traveled sites may be used as an input instead. Such lists may be considered to comprise a profile of a user, for example for advertisement targeting or for finding friends or partners. Such a user profiling tool can be used, in some embodiments of the invention, to extrapolate from an existing, studied group of users to a large group which is not studied in detail but whose brewsing habits are known.

A set of sites may be filtered, manually or automatically, prior to being used as an input set, for example, a user manually selecting a subset of links or a topic word for use in analyzing the suitability of the links.

Optionally, the resulting hubs are considered a set of hubs which are similar to the input hub or at least an aspect of the input hub, and may thus be presented to a user.

In one embodiment of the invention, a set of similar hubs is analyzed, to harvest information which may be useful, for example to the owner of the provided hub. In one example, the links of the similar hubs are collated, filtered and/or ranked, to detect links or textual descriptive material of links that are missing from the input hub and might be desirable. In another example, links that exist in the provided hub are ranked based on the particulars of the appearance of such links in the similar hubs. In another example, a new hub is created, possibly ad-hoc, based on the analyzed similar hubs.

The similar hubs that are found may be real hubs searched for in the Internet. Alternatively to finding Internet hubs, interest hubs of users may be determined. A database of user's browsing habits or favorite links may be considered as hubs, one for each user. The search for hubs then comprises searching in this database for users, whose interest hubs are relevant to a provided set of input hubs. The expansion of sites into hubs may be performed on the Internet, in which case the found hubs reflect the common association of links. These hubs may be used to find links that exist in the database of user habits. Alternatively also the expansion of sites into hubs is performed in the user habits database, in which case the found hubs reflect the preferences of the particular user in the database. A similarity between user browsing habits (or favorite links) and hub sites, which may be noted, is that both are lists of links that are organized by a thinking being to reflect a particular thought, topic or personality.

An aspect of some embodiments of the invention relates to a method of presenting a list of hub sites. Alternatively or additionally, to providing as a list of sites, the sites may be provided along with auxiliary information, for example, information about link structure, such as number of links, number of unique links (not in other pages), number of popular links (on at least k pages), amount of explanation for each link, method of ordering of links in the page (alphabetic, topical, regional, racked, etc.), information copied from the target pages, such as the links themselves and/or explanations about the links. Copied information may be collated, for example, by target link (or equivalent links), or grouped according to other criteria, such as length, alphabetic, topic, rank, region and/or repetition.

There is thus provided in accordance with an exemplary embodiment of the invention, a method of finding WWW pages, each of which includes at least one list of links to desired Internet resources, comprising:

providing a list of URLs;

automatically generating at least one query for an Internet search tool for WWW pages that include links to at least one URL of said list of URLs;

executing said at least one generated query to provide search results that include at least one of said searched for WWW pages; and generating a response comprising at least one indication of one of said WWW pages, responsive to said search results. Optionally, the method comprises displaying said response to a user. Alternatively or additionally, said at least one URL comprises a plurality of URLs. Alternatively or additionally, said response is generated using a singe search step and no iterations. Alternatively or additionally, said method comprises ranking said search results. Optionally, ranking of a WWW page is responsive to a number of groups of URLs pointed to by said WWW page.

In an exemplary embodiment of the invention, said generating at least one search query, comprises:

dividing said list of URLs into a plurality of groups and generating at least a single query for each group, wherein said at least a single query does not differentiate which URL in said group is pointed to by the results of the search, wherein said executing comprises executing said generated at least one query for a plurality of said groups, generating a plurality of result lists. Optionally, all of said groups have a same number of members. Alternatively, at least three of said groups have a different number of members from each other.

In an exemplary embodiment of the invention, the method comprises collating said result lists into a single list of search results. Optionally, the method comprises ranking the contents of at least one of said result lists. Optionally, said collating is responsive to said ranking of said at least one of said result lists. Alternatively or additionally, said ranking is applied to said result list after it is generated. Optionally, the method comprises filtering said at least one result list responsive to said ranking.

In an exemplary embodiment of the invention, said ranking is applied to said result list during said execution. Optionally, said ranking is applied by adding at least one limitation to said at least one generated search query.

In an exemplary embodiment of the invention, said ranking comprises ranking responsive to a number of said URLs pointed to by said result list. Alternatively or additionally, said ranking comprises ranking responsive to a morphological property of pages of said at least one result list. Optionally, said morphological property comprises the existence of a link list.

In an exemplary embodiment of the invention, said ranking indicates a probability of a ranked page being a hub. Alternatively or additionally, said ranking comprises ranking responsive to the presence of at least one key word in pages of said at least one result list. Optionally, said key word comprises a word that is related to a content of said list of URLs. Alternatively or additionally, said key word comprises a word that serves as a statistical indicator that the page is a hub. Optionally, said key word is selected from the group "links", "index" and "resource".

In an exemplary embodiment of the invention, said providing comprises a user providing a list of URLs. Optionally, said use provided list of URLs comprises at least a part of a URL bookmark file.

In an exemplary embodiment of the invention, a method according to claim 1, wherein said providing comprises a user providing a WWW page including a list of URLs. Alternatively or additionally, said providing comprises:

a user providing one or more topic words; and executing a preliminary search to find a list of URLs related to said one or more topic words. Alternatively or additionally, said providing comprises:

a user providing a WWW page; and executing a preliminary search to find a list of URLs that point to pages similar to the provided WWW page. Optionally, said executing said at least one generated query comprises executing said at least one query to ignore WWW pages that include links to said user provided URL.

In an exemplary embodiment of the invention, the method comprises filtering said search results before said generating. Alternatively or additionally, said search tool comprises a search engine. Optionally, said executing said at least one query comprises executing using a pipe feature of said search engine to limit a second search step to a list of sites found in a first search step using said search engine.

In an exemplary embodiment of the invention, said response comprises a list of said WWW pages. Optionally, said response includes link statistics for said WWW pages. Optionally, said link statistics include a number of links in each WWW page. Alternatively or additionally, said link statistics include an indicator of a uniqueness of links in each WWW page. Alternatively or additionally, said link statistics include an indicator of an amount of information associated with links in each WWW page.

In an exemplary embodiment of the invention, said response comprises a list of links listed in at least one of said WWW pages. Optionally, said response comprises a list of links listed in at least a given number of said WWW pages. Optionally, said given number is greater than 1. Alternatively, said given number is greater than 2.

In an exemplary embodiment of the invention, said list is arranged by WWW pages. Alternatively or additionally, said list comprises information associated with a link in its corresponding WWW page. Alternatively or additionally, said list indicates pages not including a link to any URL in a predetermined list of URLs. Alternatively or additionally, said list indicates pages not including a link from the contents of any URL in a predetermined list of URLs. Optionally, said predetermined list is provided by a user.

There is also provided in accordance with an exemplary embodiment of the invention, a method of finding WWW pages, each of which includes at least one list of links to desired Internet resources, comprising:

providing at least one URL;

generating a list of URLs related to said at least one URL;

determining at least one WWW page that includes links to at least one URL of said list of URLs but not to said provided at least one URL; and generating a response comprising at least one indication of one of said at least one WWW page. Optionally, the method comprises displaying said response to a user. Alternatively or additionally, said at least one WWW page comprises a plurality of WWW pages. Optionally, said providing comprises providing a WWW page including having a link to said at least one URL.

In an exemplary embodiment of the invention, said providing comprises providing a list of a plurality of URLs. Alternatively or additionally, generating a list of related URLs, comprises generating a list of competition URLs. Alternatively or additionally, generating a list of related URLs, comprises generating a list of similar URLs. Alternatively or additionally, generating a list of related URLs, comprises finding WWW pages characterized in that a common WWW page includes links to at least one of said WWW pages and at least one of said at least one URL. Alternatively or additionally, said determining comprises executing a query on a search engine.

BRIEF DESCRIPTION OF THE DRAWINGS

Particular embodiments of the invention will be described with reference to the following description of some embodiments of the invention in conjunction with the figures, wherein identical structures, elements or parts which appear in more then one figure are optionally labeled with a same or similar number in all the figures in which they appear, in which.

DETAILED DESCRIPTION OF SOME EMBODIMENTS GENERAL

Figure 1:
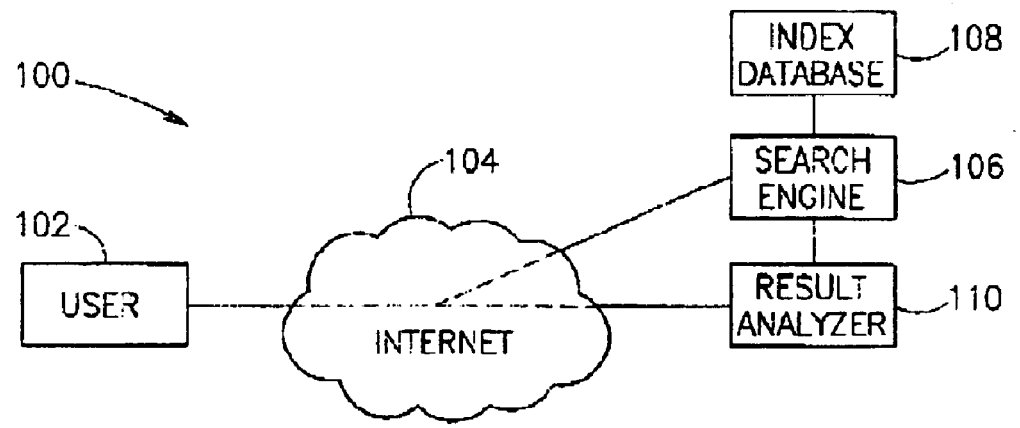
FIG. 1 is a schematic illustration of a configuration of a search engine in accordance with an exemplary embodiment of the invention.

FIG. 1 is a schematic illustration of a configuration 100 of a search engine 106 in accordance with an exemplary embodiment of the invention. A user 102 uses search engine 106 for finding sites of interest on an Internet 104. The connection to search engine 106 is typically also through Internet 104, but is not required. Typically, search engine 106 utilizes a database 108 that contains indexes and other information relating to WWW pages known to search engine 106. In a typical search engine, a user provides terms and the engine responds with a list of sites that include some of the terms. Some, more advanced search engines also provide sites that appear to be related for various reasons. In some embodiments of the invention, a directory including an index of which sites link to which other sites is used as a search tool.

A search engine result analyzer 110 is optionally provided, to analyze the results of the search of index 108 by search engine 106 and to provide analyzed results to user 102. Optionally, as will be described below, analyzer 110 also executes particular searches on search engine 106. Although result analyzer 110 is optionally configured to work best with a particular search engine 106, a same analyzer can work with a plurality of search engines.

An analysis of search results is generally desired as search engines do not typically provide a single or small number of exactly matching sites, rather, based on keyboards or subject fields, a large number of sites that might be suitable are provided. Wading through a long list of sites is extremely time consuming. One reason for this required wading is the lack of suitable software for determining if a particular site is really relevant to user 102. Also, valuable sites are often missed. Even indexing sites, such as Yahoo!, which use human indexers, often do not supply a suitable site, for several reasons, including, (a) not being up to date; (b) lack of coverage over much of the Internet; (c) lack of suitable manpower and/or time for such manpower to cover all the myriad subjects on the Internet; and (d) lack of a suitable index structure.

Typical reasons that a user browses the Internet for information include:

(a) searching for an answer to a particular question, optionally answered by an authority on that question;

(b) looking for an overview of a particular field; and (c) searching for a set of sites, from which the user can derive his or her own conclusions.

The inventors of the present invention have realized that in many fields there are interested people who have compiled their own listing of relevant sites and an analysis of each relevant site; such listing sites are known as hubs. Thus, it is generally useful to provide a user with a short list of such hubs. The inventors have also realized that reviewing such hubs by a user may be a better way for the user to find a dependable and knowledgeable authority in a field, than by merely relying on an automated program that analyses links between sites. Neglecting a search for potential authorities, in accordance with some embodiments of the invention can allow a faster method to be used for finding hubs. Once these hubs are determined, there are other, further types of analysis that can be usefully presented to a user and answer other information gathering questions the user might have.

Following are several methods of analyzing search results to assist an interested user 102 in finding one or a small number of relevant sites or hub sites. Although not explicitiy described in each of the below-described methods, additional filtering steps for rejecting certain sites as being unsuitable may be provided. Also it is noted that a block portion of one method may be suitable for inclusion, as is, in another method, as is also described in the exemplary implementation method, described herein.

A user may have a particular question to which be desires an answer. However, the words used in the question often do not match the words used in the field, or in the particular site that holds the answer to the user's question. In some cases, there is no common way of describing the subject of the question. Each hub can be considered, among other things, to be a dictionary of synonyms. Once a user finds one hub, the common usage of names of describe the subject of the question, generally becomes clear.

FINDING HUBS

Figure 2:
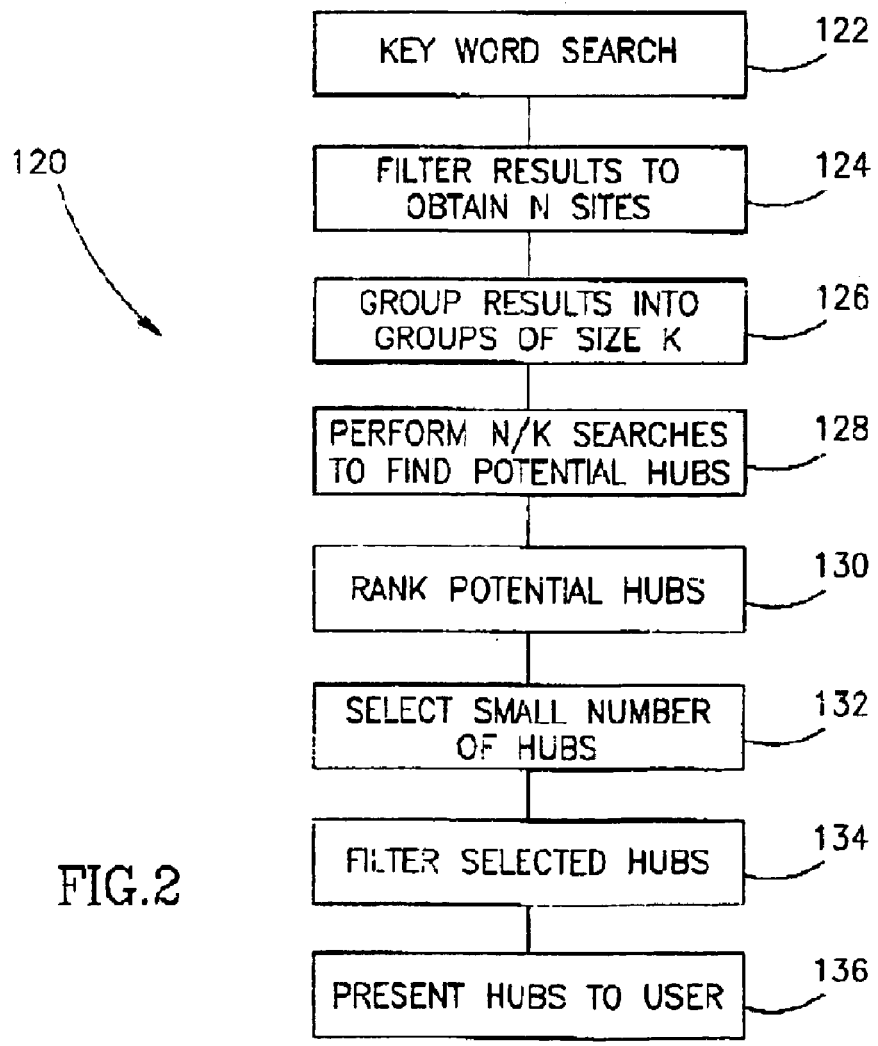
FIG. 2 is a flowchart of a method for finding hubs, in accordance with a exemplary embodiment of the invention.

FIG. 2 is a flowchart 120 of a method for finding hubs, in accordance with an exemplary embodiment of the invention.

First, a keyboard search (122) is performed. Alternatively, other ways of locating a plurality of sites related to the subject matter, may be used, for example, the listing of links in an existing hub may be used. Other method of providing link lists are described below. Optionally, the number of sites returned is limited, for example, to 50.

An optional filtering step 124 may be performed to remove sites that are clearly unsuitable, for example multiple results in a same domain. Other possible filtering rules include: removing internal sites of other search engines, removing sites with low ratings on based on the site size or creation/revision date. After filtering, there are N sites, where N may be a result of the filtering or the filtering may be adapted to achieve a desired value for N.

The filtered search results are then grouped into groups (126), of size K, for example K=4. In some embodiments of the invention, K is a function of N. Alternatively or additionally, K is a function of the results in the group, for example, one group may have a small number of high ranking results while another group has a large number of low-ranking results. It is not, however, required that all groups be the same size. Various grouping methods may be used, for example, randomly selecting sites, based on order in search results (either selecting blocks or sites, or selecting evenly or non-evenly spaced sites from the search results), based on a ranking method, to create groups with balanced ranks or search order (e.g., two high and two low ranks) and/or grouping similar sites together. Optionally, the size of the group may be inversely related to the ranking of sites in the groups.

A plurality of potential hubs are determined in step 128, by searching for sites that include links to any site in one of the groups. Only N/K searches are required. In an exemplary search engine 106, for each group the search is for sites that include reference to or link to the http address of at least one of the sites in the group, e.g. the search term being: "www/site1.com OR www.site2.com OR www.site3.com/stuff OR www.site4.com". Optionally, this search includes a request for ranking of search results by the search engine.

The results of all the searches are collated and then optionally ranked (130). In an exemplary ranking scheme, a two digit number is used, the tens being the number of searches the site came up on and the ones being the existence and number of special keywords that appear in the potential hub (to be described below). A four digit scheme may also be used. Also, different ranking methods or different weights for the different factors may be used. Exemplary special keywords are words that indicate that a site is more likely to be a hub (described below) or words from the subject topic or from the original search. In some cases, such topic words can be gleaned from the original search results (122), for example from the page topics or provided by a user.

In a step 132, a small number of hubs are selected for further consideration, for example based on the ranking.

In an optional step 134, the selected hubs are filtered to remove sites that are not desirable, for example based on an analysis of their content. Exemplary analysis rules that can be applied are: counting the number of links from the site; counting the number of links which also appear on other potential hubs; eliminating potential hubs which are almost identical to other potential hubs. Typically, but not necessarily, a larger number of links indicates a more desirable hub. If however, the number of links is too high, this may indicate an omnibus hub that may be too difficult to use, if it is not organized. A later optional step of analyzing the amount of content associated with each link and/or the organization of the links may be used to determine if such an omnibus hub is suitable for the user.

The filtered hubs are then presented to user 102 (136). In an exemplary embodiment of the invention, the filtered hubs are presented as list of links. Alternatively or additionally, the sites may be provided along with auxiliary information, for example, information about link structure, such as number of links, number of unique links (not in other pages), number of popular links (on at least k pages or top q pages), amount of explanation for each link, method of ordering of links in the page (alphabetic, topical, regional, ranked, etc.), information copied from the target pages, such as the links themselves and/or explanations about the links. Alternatively or additionally, the list may indicate or be separated into pages that include many (or any) links to the user provided URL(s) and those pages that do not.

It is noted that in some embodiments of the invention hubs are found without finding authorities at the same time. A potential advantage is obviating a need for an iterative process to identify the hubs. In an exemplary embodiment of the invention, the step of determining an authority is performed manually by a user browsing through a short list of found hubs, to see which link in the hubs is suggested, by the hub, or by its contents, as a suitable authority. It is expected that in many cases, this method of finding an authority will yield better results than automatic determination of authorities, as many hubs are composed by experts and contain many hints that an automated method might not grasp, while a human user will. In this context it should be noted that many sites include links to other sites, for many reasons, which may have nothing to do with searching for information. However, when a hub includes a list of links, the list itself is often put together with some thought or logic.

In an exemplary embodiment of the invention, after relevant hubs for a field of interest are found, these hubs may be analyzed to determine whether or not a particular target site is pointed to, by the found hubs. This determination may be used, for example, for updating the hubs by the hub owner or a party offering a service of hub updating and supplementing.

Alternatively or additionally, the hubs are analyzed to detect and/or utilize inconsistencies between a search engine index and the actual state of WWW sites in the world. In one example, a new WWW site can be detected by finding it on a hub. In another example, a search result listing can be analyzed to detect relevant or virtual hubs and then the links in the hubs compared to the search results so as to provide to a user with a list limited to new sites.

Alternatively or additionally to using a keyboard search as an input for a hub finding method, the input list of sites many be a listing of possible competitors. Such a list may be generated, for example, using a "find similar sites" feature common in many search engines, as applied to a site of interest, or provided by a user or found automatically by analyzing collections of sites. Optionally, the site of interest is indicated, in the search query, as desirable not to be found in the resulting hubs. This allows the finding of hubs that should contain a link to the site of interest but do not.

In a competition scenario, the most relevant hubs may be characterized, at least in part, by the number of competition sites pointed to by the potential hubs.

One method of finding such hubs is to search for hubs that include links to any one of the first N (e.g., 10) competitor sites. The search can be performed for example as shown in FIG. 2 at 128, in which groups of sites are search together or potential hubs may be found for each individual. The results can filtered, for example as described above. The links in the found potential hubs can be collated and ranked. Optionally, if the provided or determined competitor list is too short (e.g., below a threshold length or not providing reasonable results, for example if the number of total links or hubs to the competitors as a group and/or as individuals is greater than a threshold value), it may be augmented, for example with other relevant sites, such as sites that include topic words found in the competition sites or provided by the user.

FIND MATCHING SET

Figure 3:
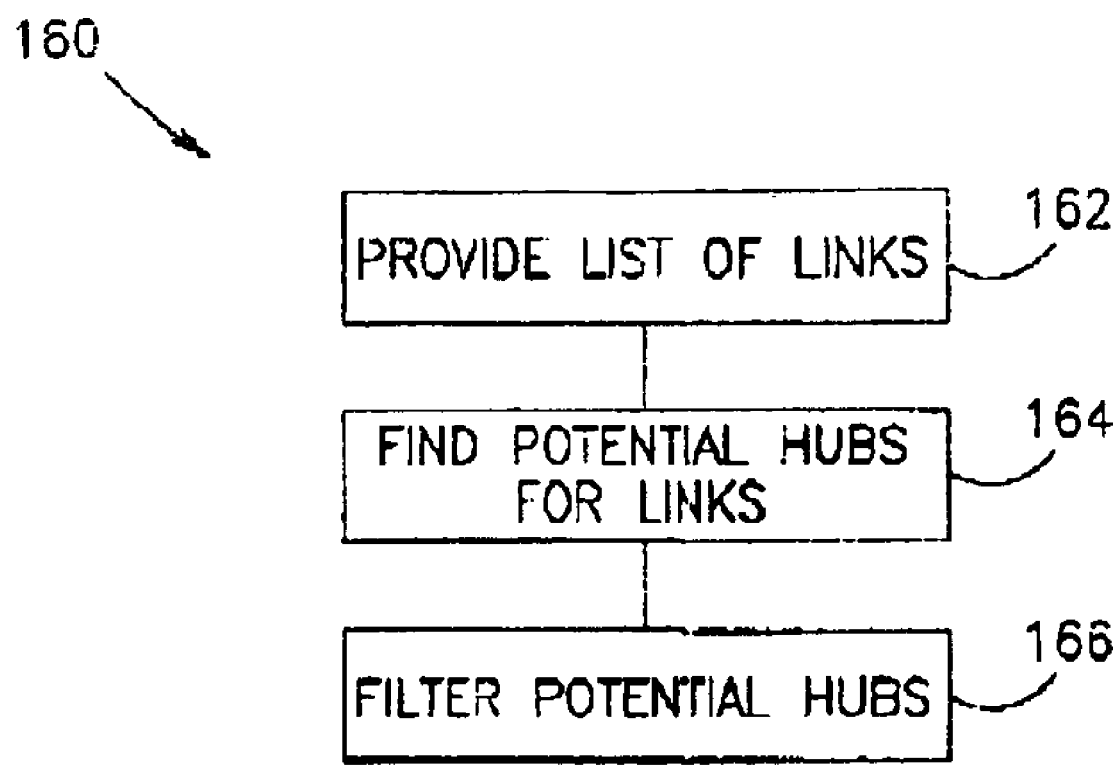
FIG. 3 is a flowchart of a method of finding sites similar to a provided list of sites, in accordance with an exemplary embodiment of the invention.

FIG. 3 is a flowchart 160 of a method of finding hubs similar to a provided list of sites and/or an existing hub, in accordance with an exemplary embodiment of the invention. The similarity is embodied in a similarity of the content, type and/or other characteristics of links from and/or to the sites. In some cases, sites that are similar to individual ones of the provided sites are sought. In other cases, a found site is similar to a combination of the provided example sites. This method is useful, for example, for finding a group of sites that may be of interest to a particular user.

In a step 162, a list of links is provided. This list may be provided in many ways, for example being gleaned from a provided set of sites to which similar sites are sought. In another example, this list may comprise a list of "favorites" or bookmarks or a user, of the list of links in such a list of favorites. In another example, the links are copied from the link list of a particular hub.

In a step 164, the method of FIG. 2 is desirably applied to find potential hubs for the links. Other methods may be used as well.

In an optional filtering step 166, some of the potential hubs are filtered out.

The resulting potential hubs may indicate other users whose interests are similar to those of a user who provided a "favorites" list.

VARIATIONS

In the above description, several filtration methods are described. An additional filtration method of hubs or sites can be based on the presence or lack of presence of topic words. Even if a user does not provide such topic words to begin with, these words may be automatically gleaned, for example from title or summary sections of relevant pages or by analyzing the test of URLs. It is noted that some search engines can be controlled to search for common words only in "summary" parts of the page or in anchor portions of the page (near links).

Another filtration method takes into account the presence of links that are essentially garbage links, such as promotions or advertising. These links may be repetitive or only a part of the link, for example the domain name is repeated. Optionally, a database of such links and their fields is maintained, so that if these links are actually of interest, this fact can be determined by the field of search matching that in the database.

Another filtration method analyzes a site based on its hub-likeness. Such an analysis may be based on the number and organization of links, existence of special sections titled, for example, "additional links" and/or the use of words common in hubs, such as "links", "index", and "resource".

A typical reason for a user searching for a hub (usually a plurality of hubs) is as a starting point for searching on a subject X. Not all hubs are equally suitable. Desirably, a "best" hub will optionally meet as many as possible of the following criteria:

(a) There are many links to relevant sites.

(b) The links are divided into meaningful categories.

(c) Each link is followed by some explanation concerning the site it points to.

These criteria can be checked using methods described herein, to rank hubs. In particular, the division of the links into categories can be determined by clustering methods. For example, taking each group of links and finding whether there are many or few hubs and include many of the links in the group.

As noted above, a search may be limited to a search in links of potential hubs or selected (by a user or automatically) ones of the hubs. Some search engines, such as "infoseek" include such a tool. Alternatively, a search can be limited by requiring the presence of selected ones of the links. Typically, the length of the search clause is limited, so that it may need to be repeated several times, each time with other of the relevant links. Alternatively or additionally, searching may be performed using a smart agent or through a web site (or software tool) dedicated to the application of the present invention.

In some embodiments, it is desirable to rank the results based on the number of links to a site in the results. Some engines provide such a result. In other search engines, the number of displayed results can be limited to zero or one, so only the total count needs to be looked at. Alternatively, a connection to the search engine is broken as soon as the number of results is provided.

As noted above, the searching for potential hubs is optionally statistical, in that groups of sites are treated as single units. However, in some cases it is useful to treat at least one hub on an individual basis, for example if the hub is deemed to have been updated lately or based on its rank. Such a hub may be retrieved and/or the hub may be compared to each of the links, to see which links the hub actually includes.

APPLICATION OF THE ABOVE METHODS

The above methods may be applied in many ways, only exemplary ones of which are described below.

In one exemplary application, a service is provided to find hubs to which a WWW site should belong. Money can be charged based on clicks to the site and/or purchases at the site following travel through the links. The above analysis methods can be use, for example, to suggest to the site and/or to the hubs the suitability of listing the site. A service provider may sign contracts with the hubs to list sites at the service provider's request. The service provider can also provide an indexing service of pointing to the hubs of interest in a particular field. Unlike current Internet indexes that are all centralized, the service provider provides a distributed index, of which the service provider may not own any part, but optionally controls the existence of at least a limited number of relevant sites for the field that the index covers, in the particular slant (role) of that distributed index site. Optionally, but not necessarily, at least part of each distributed index part is arranged in a standardized format.

In an exemplary embodiment of the invention, the service provider can contact the hubs, to determine that additional site links are desired, and/or the sites, to determine that additional listings in hubs are desired. Once either an interested site owner or hub owner are determined, a partner (hub or site) for completing the listing transaction can usually be found. Alternatively, competing hubs may be set up by the service provider.

In one exemplary implementation, the service provider provides the list of sites as a file including also promotional material, so that the site owner will copy the link list with the promotional material. Alternatively or additionally, the links provided are not links directly to the targets, instead, the link passes through a server controlled by the service provider, for example to track access for charging purposes, which server can, for example, add promotional material and/or assure that the site links are up-to-date.

It is noted that one or more of the tasks of mapping sites, personalization of search engines, ranking of relevant sites and/or altering to new sites may be provided in a significantly more efficient manner than known in the art using the methods described above, to some embodiments of the invention.

As part of competitive hubs or as a service at participating hubs, the service provider can update the site listing periodically, to reflect the changes in the Internet. Alternatively, a virtual hub (based on the method of FIG. 2, for example), may be generated ad hoc, at a user's request. The listing may be generated in real-time or it may be updated periodically, for example once a week.

SPECIFIC ALGORITHMS

In a particular implementation of the invention, which includes some of the above described methods, the following algorithms are implemented. Comments provided for a particular method step are not repeated for all the methods. First described are component algorithms. Then, composite algorithms that build on the component algorithms are described.

Finding potential hubs

This algorithm corresponds generally to the method of FIG. 2.

Name : Centers (T)

Input : a set, T, of one or more target urls.

Output : a set of hubs that link to many urls in T.

Algorithm:
1. T'=filter (T)<delete blacklist, long url>. The source set T is filtered, for example removing long URLs and URLs on a black list.
2. Partition T' into sets of size K: $t_1, \ldots, t_n$ using partition method. The set is divided into small groups of URLs.
3. Define Link-to($t_i$)=all non internal links to $t_i$.
4. For each i, compute Link-to'($t_i$)
   i. Choose searchengine/settings
   ii. Subunit query: link:$t_{i1}$ ... link: $t_{iK}$ topic "links" "index" "resources"
   iii. Terminate query aflex timeout
5. Raw Score(c)=|{$t_i$|caLink-to'($t_i$), i=1, . . . , n}| This is a measure of whether the site acts like a hub (number of links)
6. TitleScore(c): This is a measure of whether the site looks like a hub.
   i. {"links" "index" "resources"}=+3
   ii. one topic words=+3; two=+5; three=+6
7. Score(c)=10*RawScore+TitleScore(c)
8. Centers'(T)={c|Score(c)>scorethreshold, Score(c) in top rankthreshold}
9. Center(T)=Filter(Centers'(T))<for each family keep highest score, delete dated>. Various hubs are removed, for example old hubs and mirror sites of other hubs.

Note: for T=single url: skip 1, 2, 4iii; RawScore=1 Parameters: K, partition method, searchengine/settings, timeout, scorethreshold, rankthreshold.

Finding potential hubs missing a link

This algorithm is one of the variations described with reference to FIG. 2, for finding hubs that do not point to a particular site that belongs to a topic of the hubs.

Name : CentersAbsent(T, url)

Input : a set, T, of one or more target urls; url

Output : a set of hubs which link to many urls in T but don't link to url.

Algorithm:
1. T'=filter(T)<delete blacklist, long url>
2. Partition T' into sets of size K: $t_1, \ldots, t_n$ using partitionmethod 3. Define Link-to($t_1$)=all non internal links to $i_j$.
4. For each i, computer Link-to-absent ($t_i$)
   i. Choose searchengine/settings
   ii. Submit query: -link:url link:$t_{i1}$ ... link:/$_{iK}$|topic "links" "index" "resources" (Topic can be a parameter or it may be determined from the search results)
   iii. Terminate query after timeout
5. RawScore(c)=|{$t_i$|c∈Link-to-absent($t_i$), i=1, ..., n}|
6. TitleScore(c):
   i. {"links" "index" "resources"}—+3
   ii. one topic word=+3; two—+5; three=+6
7. Score(c)=10*RawScore+TitleScore(c)
8. Centers'(T)={c|Score(c)>scorethreshold, Score(c) in top rankthreshold}
9. Centers(T)=Filter(Centers'(T))<delete dated>

Parameters: k, partitionmethod, searchengine/settings, timeout, scorethreshold, rankthreshold Finding sites relevant to a topic This algorithm allows a user to selectively provide a list of sites or a topic, as an input into the other methods.

Name : Relevant(topic)
Input : topic
Output : sites about topic
1. Get top $k_S$ sites on searchengine
2. Filter <remove duplicates, junk>

Parameters: searchengine, $k_S$

Finding hubs about a topic

This algorithm is one implementation of the method of FIG. 2.

Input: topic
Output: Hubs on topic
Algorithm:
1. Compute Relevant (topic)
2. Computer Centers (Relevant(topic, searchengine))

Find similar hubs

This algorithm identifies hubs that are similar to a known hub, relate to a same subject field and thus are useful as a starting point for searching.

Name : SimilarHubs (for single hub c)
Input : hub c, topic
Output : Similar hubs
Algorithm:
1. Compute Targets(c)=external links in a
2. If |Targets(c)|=20−j
   i. Get Relevant(topic) <top j>
   ii. Targets'(c)=Targets(c)∪Relevant(topic)
3. If |Targets(c)|=k≦200. A parameter of the method.
   i. Targets'(c)=|Targets(c)|/Floor(|Targets(c)|/100) of Targets(c) <Select periodically>
4. Else Targets'(c)−Targets(c)
5. Compute Centers (Targets'(c))

Find potential hubs that should list a site

This algorithm identifies hubs that do not point to a particular site (FIG. 2).

Name : Plate Target
Input : url, topic
Output : hub sites not linked to url
Algorithm:
1. Gel Competitors(url)
2. For each t∈Competitors(url) compute CentersAbsent(t, url)
3.
4. If |CentersAbsent(t, url)|<20 Compute Relevant(topic)
5. Compute CentersAbsent (Relevant(topic), url)
6. PlaceLink(url)=[CentersAbsent(r, url)∪CentersAbsent (Relevant(topic), url)]—Similar(Link-to(url))
7. IF c∈-CentersAbsent(t, url) Score(c)=10+RawScore(c) (in CentersAbsent(Relevant(topic), url))

PHYSICAL IMPLEMENTATION

Search result analyzer 110 may be implemented in various ways, optionally without limiting its ability to provide the services described above.

In one example, search analyzer 110 is integrated with search engine 10, possibly in a same computer or in a LAN thereof.

In another example, search analyzer 110 is a separate WWW server that contacts search engine 106 via the internet or directly.

In another example, search analyzer 110 is, at least in part, a client software executing on user 102. This client software may be permanent or it may be a network programmed, e.g. Java, applet that is downloaded by user 102 at need.

It will be appreciated that the above described methods of hub and site finding may be varied in many ways, including, changing the order of steps, which steps are performed on-line or off-line, such as table or index preparation, and the exact implementation used, which can include various hardware and software combinations. In addition, a multiplicity of various features has been described. It should be appreciated that different features may be combined in different ways. In particular, not all the features are necessary in every preferred embodiment of the invention. Software as described herein is preferably provided on a computer readable media, such as a diskette or an optical disk. Alternatively or additionally, it may be stored on a computer, for example in a main memory or on a hard disk, both of which are also computer readable media. Where methods have been described, also computer hardware programmed to perform the methods is within the scope of the description. When used in the following chains, the terms "comprises", "includes", "have" and their conjugates mean "including but not limited to".

It will be appreciated by a person skilled in the art that the present invention is not limited by what has thus far been described. Rather, the scope of the present invention is limited only by the following claims.

What is claimed is:

1. A method of finding WWW pages, each of which includes a least one list of links to desired Internet resources, comprising:

providing a list of URLs;

automatically generating at least one query for an Internet search tool for WWW pages that include links to at least one URL of said list of URLs;

executing said at least one generated query to provide search results that include at least one of said searched for WWW pages;

generating a response comprising at least one indication of one of said WWW pages, responsive to said search results;

wherein said response comprises a list of links listed in at least one of said WWW pages; and wherein said list indicates pages not including a link to any URL in a predetermined list of ULRs.

2. A method according to claim 1, comprising displaying said response to a user.

3. A method according to claim 1, wherein said at least one URL comprises a plurality of URLs.

4. A method according to claim 1, wherein said response is generated using a single search step and no iterations.

5. A method according to claim 1, comprising ranking said search results.

6. A method according to claim 5, wherein ranking of a WWW page is responsive to a number of groups of URLs pointed to by said WWW page.

7. A method according to claim 1, wherein said generating at least one search query, comprises:
dividing said list of URLs into a plurality of groups and generating at least a single query for each group, wherein said at least a single query does not differentiate which URL in said group is pointed to by the results of the search,
wherein said executing comprises executing said generated at least one query for a plurality of said groups, generating a plurality of result lists.

8. A method according to claim 7, comprising:
collating said result lists into a single list of search results.

9. A method according to claim 8, comprising ranking the contents of at least one of said result lists.

10. A method according to claim 9, wherein said collating is responsive to said ranking of said at least one of said result lists.

11. A method according to claim 9, wherein said ranking is applied to said result list after it is generated.

12. A method according to claim 11, comprising filtering said at least one result list responsive to said ranking.

13. A method according to claim 9, wherein said ranking is applied to said result list during said execution.

14. A method according to claim 13, wherein said ranking is applied by adding at least one limitation to said at least one generated search query.

15. A method according to claim 9, wherein said ranking comprises ranking responsive to a number of said URLs pointed to by said result list.

16. A method according to claim 9, wherein said ranking comprises ranking responsive to a morphological property of pages of said at least one result list.

17. A method according to claim 16, wherein said morphological property comprises the existence of a link list.

18. A method acquiring to claim 9, wherein said ranking indicates a probability of a ranked page being a hub.

19. A method according to claim 9, wherein said ranking comprises ranking responsive to the presence of at least one key word in pages of said at least one result list.

20. A method according to claim 19, wherein said key word is related to a content of said list of URLs.

21. A method according to claim 19, wherein said key word is a word that serves as a statistical indicator that the page is a hub.

22. A method according to claim 1, wherein said providing comprises a user providing a list of URLs.

23. A method according to claim 22, wherein said user provided list of URLs comprises at least a part of a URL bookmark file.

24. A method according to claim 1, wherein said providing comprises a user providing a WWW page including a list of URLs.

25. A method according to claim 1, wherein said providing comprises:
a user providing one or more topic words; and
executing a preliminary search to find a list of URLs related to said one or more topic words.

26. A method according to claim 1, wherein said providing comprises:
a user providing a WWW page; and
executing a preliminary search to find a least of URLs that point to pages similar to the provided WWW page.

27. A method according to claim 26, wherein said executing said at least one generated query comprises executing said at least one query to ignore WWW pages that include links to said user provided WWW page.

28. A method according to claim 1, comprising filtering said search results before said generating.

29. A method according to claim 1, wherein said search tool comprises a search engine.

30. A method according to claim 29, wherein said executing said at least one query comprises executing using a pipe feature of said search engine to limit a second search step to a list of sites found in a first search step using said search engine.

31. A method according to claim 1, wherein said response comprises a list of said WWW pages.

32. A method according to claim 31, wherein said response includes link statistics for said WWW pages.

33. A method according to claim 32, wherein said link statistics include a number of links in each WWW page.

34. A method according to claim 32, wherein said link statistics include an indicator of a uniqueness of links in each WWW page.

35. A method according to claim 32, wherein said link statistics include an indicator of an amount of information associated with links in each WWW page.

36. A method according to claim 1, wherein said response comprises a list of links listed in at least a given number of said WWW pages.

37. A method according to claim 36, wherein said given number is greater than 1.

38. A method according to claim 36, wherein said given number is greater than 2.

39. A method according to claim 1, wherein said list is arranged by WWW pages.

40. A method according to claim 1, wherein said list comprises information associated with a link in its corresponding WWW page.

41. A method according to claim 1, wherein said WWW pages that include links are not in said provided list of URLs.

42. A method according to claim 1, wherein said WWW pages that include links, include links to more than one URL of said list of URLs.

43. A method of finding WWW pages, each of which includes at least one list of links to desired Internet resources, comprising:
providing a list of URLs;
automatically generating at least one search query for an Internet search tool for WWW pages that include links to at least one URL of said list of URLs;
executing said at least one generated query to provide search results that include at least one of said searched for WWW pages;
generating a response comprising at least one indication of one of said WWW pages, responsive to said search results;
wherein said generating at least one search query, comprises:
dividing said list of URLs into a plurality of groups and generating at least a single query for each group, wherein said at least a single query does not differentiate which URL in said group is pointed to by the results of the search, wherein said executing comprises executing said generated at least one query for a plurality of said groups, generating a plurality of result lists; and wherein all of said groups have a same number of members.

44. A method of finding WWW pages, each of which includes at least one list of links to desired Internet resources, comprising:

providing a list of URLs;

automatically generating at least one search query for an Internet search tool for WWW pages that include links to at least one URL of said list of URLs;

executing said at least one generated query to provide search results that include at least one of said searched for WWW pages;

generating a response comprising at least one indication of one of said WWW pages, responsive to said search results;

wherein said generating at least one search query, comprises:

dividing said list of URLs into a plurality of groups and generating at least a single query for each group, wherein said at least a single query does no differentiate which URL in said group is pointed to by the results of the search, wherein said executing comprises executing said generated at least one query for a plurality of said groups, generating a plurality of result lists; and wherein at least three of said groups have a different number of members from each other.

45. A method of finding WWW pages, each of which includes at least one list of links to desired Internet resources, comprising:

providing a list of URLs;

automatically generating at least one search query for an Internet search tool for WWW pages that include links to at least one URL of said list of URLs;

executing said at least one generated query to provide search results that include at least one of said searched for WWW pages;

generating a response comprising at least one indication of one of said WWW pages, responsive to said search results;

wherein said generating at least one search query, comprises:

dividing said list of URLs into a plurality of groups and generating at least a single query for each group, wherein said at least a single query does not differentiate which URL in said group is pointed to by the results of the search, wherein said executing comprises executing said generated at least one query for a plurality of said groups, generating a plurality of result lists;

collating said result lists into a single list of search results;

ranking the contents of at least one of said result lists;

wherein said ranking comprises ranking responsive to the presence of at least one key word in pages of said at least one result list;

wherein said keyword is a word that serves as a statistical indicator that the page is a hub; and wherein said key word is selected from the group "links", "index" and "resource".

46. A method of finding WWW pages, each of which includes at least one list of links to desired Internet resources, comprising:

providing a list of URLs;

automatically generating at least one query for an Internet search tool for WWW pages that include links to at least one URL of said list of URLs;

executing said at least one generated query to provide search results that include at least one of said searched for WWW pages:

generating a response comprising at least one indication of one of said WWW pages, responsive to said search results;

wherein said response comprises a list of links listed in at least one of said WWW pages; and wherein said list indicates pages not including a link from the contents of any URL in a predetermined list of URLs.

47. A method according to claim 46, wherein said predetermined list is provided by a user.

48. A computer-implemented method of generating documents based on a search query, comprising:

obtaining an initial set of documents relevant to the search query;

assigning relevance scores to the documents based on references between the documents within the initial set; and sorting by at least one of ranking, grouping or filtering the documents based on the assigned relevance scores.

49. A computer-implemented method according to claim 48, wherein the initial set of documents relevant to the search query comprises at least two targets and at least one hub wherein a target is a site that contains a search query term and wherein a hub is a site that points to a plurality of documents; and wherein assigning relevance scores to the documents is based on references from the at least one hub to targets within the initial set.

50. A method according to claim 49, wherein said plurality of the documents are targets in the initial set.

51. A method according to claim 49, wherein the set of targets in the initial set of documents relevant to the search query further comprises sites that are linked to by a minimum number of said hubs.

52. A method according to claim 49, wherein documents in the initial set are either hubs or targets or sites that are linked to by a minimum number of said hubs.

53. A method according to claim 52, wherein hubs are further limited to those sites that include a match to said search query term.

54. A method accordig to claim 52, wherein hubs are further limited to those sites that contain descriptive text associated with references to targets.

55. A method according to claim 52, wherein hubs are further limited by counting the occurrence of phrases indicating the presence of links.

56. A method according to claim 52, wherein hubs are further limited by matching the search query term to at least one of a topic, a heading or anchor text therein.

57. A method according to claim 52, wherein hubs are further limited by usage of hub-typical words or phrases therein.

58. A method according to claim 57, wherein hub-typical words or phrases receive higher relevance scores based on their location in the hub.

59. A method according to claim 52, wherein hubs are further limited by counting the number of links.

60. A method according to claim 49, wherein said assigning is based on a number of references from hubs to targets.

61. A method according to claim 60, wherein said assigning involves no further iterations.

62. A method according to claim 49, wherein said assigning is responsive to a clustering of said targets.

63. A method according to claim 62, wherein said clustering is according to the subject matter of said targets.

64. A method according to claim 49, wherein said assigning is responsive to the presence or absence of a reference to a given target.

65. A method according to claim 49, wherein obtaining the initial set is generated using a single search query and no iterations.

66. A method according to claim 48, wherein obtaining is generated using a single search query and no iterations.

67. A computer-implemented method of responding to a search query from a user, the method comprising:
receiving the search query from the user;
generating a list of relevant documents based on search terms of the query;
generating relevance scores for the documents in the list of relevant documents based on references between the documents in the list; and
returning a set of relevant documents to the user, the set being sorted by at least one of ranking, grouping or filtering based on the relevance scores.

68. A method according to claim 67, wherein generating a list of relevant documents uses a single search query and no iterations.

69. A computer-implemented method of providing search results, comprising:
providing a search term;
generating a limited list of results indexed to said search term;
generating a limited set of pages including links to said limited list and indexed to said search term;
generating a set of search results responsive to the number of links from said limited set to pages in said limited list.

70. A method according to claim 69, wherein generating a limited set of pages comprises selecting pages including said search term.

71. A computer-implemented method of generating documents based on a search query, comprising:
obtaining an initial set of documents relevant to the search query, wherein the initial set of documents relevant to the search query comprises at least two targets and at least one hub wherein a target is a site that contains a search query term and wherein a hub is a site that points to a plurality of documents and wherein said plurality of documents are targets in the initial set;
assigning relevance scores to the documents based on references from the at least one hub to targets within the initial set; and
sorting by at least one of ranking, grouping or filtering the documents based on the assigned relevance scores.

72. A computer-implemented method of generating documents based on a search query, comprising:
obtaining an initial set of documents relevant to the search query, wherein the initial set of documents relevant to the search query comprises at least two targets and at least one hub wherein a target is a site that contains a search query term;
assinging relevance scores to the documents obtained in the initial set based on references between the documents within the initial set; and
sorting by at least one of ranking, grouping or filtering the documents based on the assigned relevance scores.

73. A method of finding WWW pages, each of which includes at least one list of links to desired Internet resources, comprising:
providing a list of URLs;
automatically generating at least one query for an Internet search tool for WWW pages that include links to at least one URL of said list of URLs;
executing said at least one generated query to provide relevance search results, wherein relevant search results include at least one of said searched for WWW pages; and,
generating a response comprising at least one indication of one of said WWW pages, responsive to said search results.

* * * * *

UNITED STATES PATENT AND TRADEMARK OFFICE
CERTIFICATE OF CORRECTION

PATENT NO. : 7,257,766 B1
APPLICATION NO. : 09/605987
DATED : August 14, 2007
INVENTOR(S) : Moshe Koppel et al.

It is certified that error appears in the above-identified patent and that said Letters Patent is hereby corrected as shown below:

On the first page in section (56) References Cited under U.S. Patent Documents insert:

U.S. Patent Documents

| | | |
|---|---|---|
| 5,257,185 | 10/93 | Farley et al |
| 5,446,891 | 8/95 | Kaplan et al |
| 5,778,363 | 7/98 | Light |
| 5,826,031 | 10/98 | Nielsen |
| 5,835,905 | 11/98 | Pirolli et al |
| 5,870,740 | 2/99 | Rose et al |
| 5,884,305 | 3/99 | Kleinberg et al |
| 5,907,840 | 5/99 | Evans |
| 5,913,208 | 6/99 | Brown et al |
| 5,920,859 | 7/99 | Li |
| 5,960,429 | 9/99 | Peercy et al |
| 6,070,158 | 5/00 | Kirsch et al |
| 6,112,202 | 8/00 | Kleinberg, et al |
| 6,112,203 | 8/00 | Bharat et al |
| 6,119,114 | 9/00 | Smadja |
| 6,211,874 | 4/01 | Himmel et al |
| 6,263,329 | 7/01 | Evans |
| 6,285,999 | 9/01 | Page |
| 6,286,000 | 9/01 | Apte et al |
| 6,421,675 | 7/02 | Ryan et al |
| 6,546,388 | 4/03 | Edlund et al |
| 6,738,678 | 5/04 | Bharat et al |
| 6,754,873 | 6/04 | Law et al |
| 6,779,176 | 9/04 | Page |

Foreign Patent Documents

| | | |
|---|---|---|
| JP 63-228221 | 9/88 | Japan |

UNITED STATES PATENT AND TRADEMARK OFFICE
CERTIFICATE OF CORRECTION

PATENT NO. : 7,257,766 B1
APPLICATION NO. : 09/605987
DATED : August 14, 2007
INVENTOR(S) : Moshe Koppel et al.

It is certified that error appears in the above-identified patent and that said Letters Patent is hereby corrected as shown below:

Other Publications

Brin et al. "The Anatomy of A Large-Scale Hypertextual Web Search Engine", <http://www.eng/library/pagerank/>, 20 P., 2000.

Bharat et al. "Hilltop: A Search Engine Based on Expert Documents", <ftp://ftp.cs.toronto.edu/cs/ftp.csrg-technical-reports/405/hilltop.html>, 12 P., 2001.

Amento et al. "Does 'Authority' Means Quality? Predicting Expert Quality Ratings of Web Documents", P.296-303, 2000.

Frisse. "Searching for Information in A Hypertext Medical Handbook", Communications of the ACM, 31(7): 880-886, 1988.

Savoy. "Searching Information in Hypertext Systems Using Multiple Sources of Evidence", International Journal of Man-Machine Studies, P.1017-1030, 1993.

Frei et al. "Making Use of Hypertext Links When Retrieving Information", ACM ECHT Conference, P.102-111, 1992.

Schwanke et al. "Cross References Are Features", From: 'Macine Learning: From Theory to Applications - Cooperative Research at Siemens and MIT', Proceedings of the 2nd International Workshop on Software Configuration Management, ACM SIG Soft, IEEE CS and GI, P.107-1989 ,123.

Arents et al. "Concept-Based Retrieval of Hypermedia Information: From Term Indexing to Semantic Hyperindexing", Information Processing & Management, 29(3): 359-371, 1993.

Rada et al. "Retrieval Hierarchies in Hypertext", Information Processing & Management, 29(3): 359-371, 1993.

UNITED STATES PATENT AND TRADEMARK OFFICE
CERTIFICATE OF CORRECTION

PATENT NO. : 7,257,766 B1
APPLICATION NO. : 09/605987
DATED : August 14, 2007
INVENTOR(S) : Moshe Koppel et al.

It is certified that error appears in the above-identified patent and that said Letters Patent is hereby corrected as shown below:

Shaw Jr. "Subject and Citation Indexing. Part I: The Clustering Structure of Composite Representations in the Cystic Fibrosis Document Collection", Journal of the American Society for Information Science, 42(9): 669-675, 1991.

Shaw Jr. "Subject and Citation Indexing. Part II: An Evaluation and Comparison", Information Processing & Management, 26(6): 705-718, 1990.

Kochtanek. "Brief Communication - Document Clustering, Using Macro Retrieval Techniques", Journal of the American Society for Information Science, 34(5): 356-359, 1983.

Nanin et al. "Bibliometrics", Annual Reviews of Information Science and Technology, P.35-58, 1977.

Bichteler et al. "Document Retrieval by Means of An Automatic Classification Algorithm for Citations", Information Storage Retrieval, 10: 267-278, 1974.

Shaw Jr. "Subject and Citation Indexing. Part II: The Optimal, Cluster-Based Retrieval Performance of Composite Representations", Journal of the American Society for Information Science, 42(9): 675-684, 1991.

Rivlin et al. "Navigation in Hyperspace: Designing A Structure-Based Toolbox", Communications of the AMC, 37(2): 87-96, 1994.

Weiss et al. "Hypursuit: A Hierarchical Network Search Engine That Exploits Content-Link Hypertext Clustering", Programming Systems Research Group, MIT Laboratory for Computer Science, 14 P., 1996.

Spielman et al. "Spectral Partitioning Works: Lanar Graphs and Finite Element Meshes", Abstract Based on Berkely Technical Report UCB//CSD-96-898, 10 P., 1996.

UNITED STATES PATENT AND TRADEMARK OFFICE
CERTIFICATE OF CORRECTION

| | |
|---|---|
| PATENT NO. | : 7,257,766 B1 |
| APPLICATION NO. | : 09/605987 |
| DATED | : August 14, 2007 |
| INVENTOR(S) | : Moshe Koppel et al. |

It is certified that error appears in the above-identified patent and that said Letters Patent is hereby corrected as shown below:

Golub et al. "Matrix Computations - Second Edition", The John Hopkins University Press, P.218-219, 351-354, 1989.

In the claims:

The last word of Claim 1, Column 14, line 63

"ULRs" should be replaced by the word --URLs--.

Signed and Sealed this

Fourth Day of March, 2008

JON W. DUDAS
*Director of the United States Patent and Trademark Office*